(12) United States Patent
Voelz

(10) Patent No.: US 8,602,478 B2
(45) Date of Patent: Dec. 10, 2013

(54) VEHICLE SEAT WITH A VARIABLE-CONTOUR SUPPORTING SURFACE

(75) Inventor: Reimer Voelz, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 415 days.

(21) Appl. No.: 12/721,123

(22) Filed: Mar. 10, 2010

(65) Prior Publication Data

US 2010/0230987 A1    Sep. 16, 2010

(30) Foreign Application Priority Data

Mar. 11, 2009 (DE) .......................... 10 2009 012 620

(51) Int. Cl.
*B60N 2/02* (2006.01)
*B60N 2/44* (2006.01)

(52) U.S. Cl.
USPC .............................. 296/63; 296/68; 297/284.1

(58) Field of Classification Search
USPC ................. 296/63, 68.1, 65.01, 65.02, 65.08, 296/65.12, 65.15, 65.17, 65.18; 297/423.3, 297/180.13, 180.14, 284.1–284.11
See application file for complete search history.

(56) References Cited

U.S. PATENT DOCUMENTS

| 3,326,601 | A | * | 6/1967 | Parkinson et al. | ......... | 297/284.6 |
| 3,330,598 | A | * | 7/1967 | Whiteside | ................. | 297/284.3 |
| 4,262,933 | A | * | 4/1981 | Fox | ................................ | 280/802 |
| 4,444,430 | A | * | 4/1984 | Yoshida et al. | ............ | 297/284.6 |
| 4,589,695 | A | | 5/1986 | Isono | | |
| 4,592,588 | A | * | 6/1986 | Isono et al. | ................ | 297/284.6 |
| 4,615,563 | A | * | 10/1986 | Kobayashi | ................. | 297/284.6 |
| 4,856,844 | A | * | 8/1989 | Isono | ........................ | 297/284.6 |
| 4,885,827 | A | * | 12/1989 | Williams | ....................... | 29/91.1 |
| 4,915,447 | A | | 4/1990 | Shovar | | |
| 4,965,899 | A | * | 10/1990 | Sekido et al. | ............. | 297/284.6 |
| 6,021,863 | A | * | 2/2000 | Stanley | ........................ | 180/273 |
| 6,074,006 | A | * | 6/2000 | Milosic et al. | ............. | 297/284.6 |
| 7,152,920 | B2 | * | 12/2006 | Sugiyama et al. | ......... | 297/284.6 |
| 2003/0107231 | A1 | | 6/2003 | Oh et al. | | |
| 2007/0057551 | A1 | | 3/2007 | Lachenmann et al. | | |

FOREIGN PATENT DOCUMENTS

| DE | 03929436 | A1 | 9/1990 |
| DE | 04034121 | A1 | 10/1991 |
| DE | 4106863 | A1 | 9/1992 |
| DE | 10046745 | C1 | 2/2002 |

(Continued)

OTHER PUBLICATIONS

British Patent Office, British Search Report for British Application No. GB1003050.0, May 19, 2010.

(Continued)

*Primary Examiner* — Glenn Dayoan
*Assistant Examiner* — Sunsurraye Westbrook
(74) *Attorney, Agent, or Firm* — Ingrassia Fisher & Lorenz, P.C.

(57) ABSTRACT

A vehicle seat is provided with a protective surface to support the vehicle passenger and a variable-shape aircushion. The contour of the supporting surface can be varied by changing the shape of the aircushion. A drivable device is also provided with which the aircushion can be compressed at least partially from outside in such a way as to vary the shape of the aircushion, and hence vary the contour of the supporting surface. A motor vehicle is also provided with such a vehicle seat.

20 Claims, 1 Drawing Sheet

(56) References Cited

FOREIGN PATENT DOCUMENTS

| | | |
|---|---|---|
| DE | 102004020116 A1 | 11/2005 |
| DE | 102006012784 A1 | 6/2007 |
| DE | 102006059541 A1 | 6/2008 |
| DE | 102007003284 A1 | 7/2008 |
| EP | 0229737 A2 | 7/1987 |
| EP | 0343025 A1 | 11/1989 |
| EP | 1698511 A1 | 6/2006 |
| FR | 2761310 A1 | 10/1998 |
| GB | 2420272 A | 5/2006 |
| WO | 2007009274 A3 | 1/2007 |
| WO | 2008031374 A1 | 3/2008 |

OTHER PUBLICATIONS

German Patent Office, German Search Report for German Application No. DE 102009012620.1, Jun. 15, 2010.

* cited by examiner

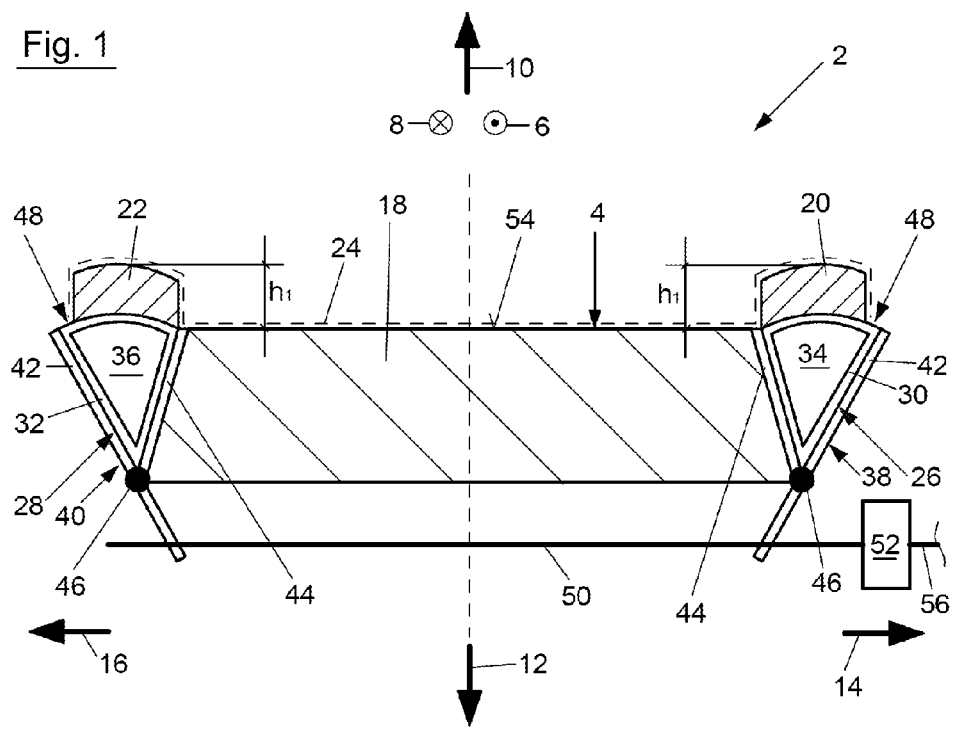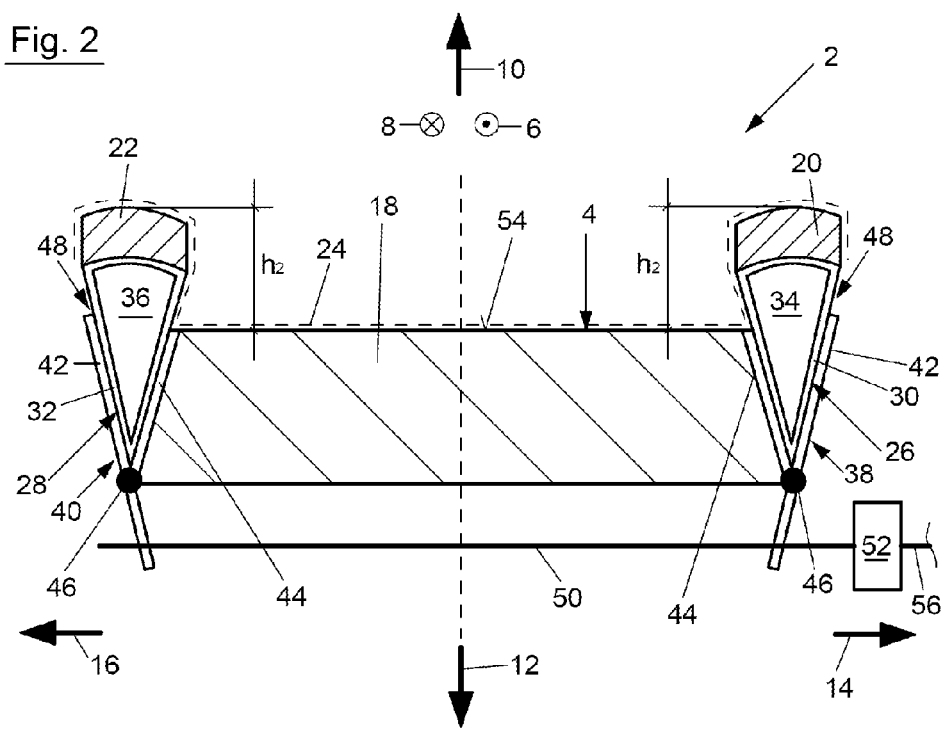

VEHICLE SEAT WITH A VARIABLE-CONTOUR SUPPORTING SURFACE

CROSS-REFERENCE TO RELATED APPLICATION

This application claims priority to German Patent Application No. 102009012620.1, filed Mar. 11, 2009, which is incorporated herein by reference in its entirety.

TECHNICAL FIELD

The present invention relates to a vehicle seat with a supporting surface for supporting the vehicle passenger and a variable-shape aircushion with a contour of the supporting surface that can be changed by varying the shape of the aircushion.

BACKGROUND

US 2007/0057551 A1 describes a vehicle seat with a supporting surface, which is comprised of the seat portion of the vehicle seat and serves to support the vehicle passenger. Arranged inside the seat portion of the known vehicle seat is a variable-shape, inflatable aircushion. The aircushion is here situated between two hinged plates. Further provided is a pump for inflating and/or evacuating the aircushion. In order to vary the contour of the supporting surface of the seat portion, the aircushion is inflated with a pneumatic system, so that the one plate is swiveled relative to the other plate. The swiveled plate acts equally on the seat portion of the vehicle seat so as to vary the contour of the supporting surface. Since the mentioned flaps and mentioned aircushion are arranged inside the sidewall of the seat portion of the known vehicle, the height of the mentioned sidewall and its inclination can hence be varied by inflating or evacuating the aircushion, so as to achieve a more precise adaptation to the respective vehicle passenger.

While the known vehicle seats with variable-shape aircushions for changing the contour of the supporting surface have proven effective, they are disadvantageous from the standpoint that their structural design is particularly complicated, and hence cost-intensive, which can be attributed especially to the required pneumatic system, which routinely encompasses a pump and corresponding connecting lines to link the pump with the aircushion. In addition, a high outlay is involved in ensuring the tightness of the pneumatic system.

Therefore, at least one object of the present invention is to provide a vehicle seat with a supporting surface and a variable-shape aircushion, with which the contour of the supporting surface can be changed, wherein the vehicle seat is to exhibit an especially simple structural design. A further object of the present invention is to provide a motor vehicle with such an advantageous vehicle seat. In addition, other objects, desirable features, and characteristics will become apparent from the subsequent summary and detailed description, and the appended claims, taken in conjunction with the accompanying drawings and this background.

SUMMARY

The vehicle seat according to an embodiment of the invention exhibits a supporting surface for supporting the vehicle passengers. In this way, the supporting surface can be formed by the surface of the seat portion or the surface of the backrest portion of the vehicle seat, for example. The vehicle seat further encompasses at least one variable-shape aircushion. The aircushion is here arranged in such a way that changing the shape of the aircushion can also vary the contour of the supporting surface, so as to adjust the supporting surface to the respective vehicle passenger. For example, the contour of the supporting surface can in this way be varied in the area of the sidewalls of the seat portion or backrest portion, so as to ensure a reliable lateral support for the vehicle passenger sitting on the vehicle seat. The embodiments of the invention provides a driver with which the aircushion can be compressed at least partially from outside in such a way as to vary the shape of the aircushion, and hence vary the contour of the supporting surface.

While the aircushion is always inflated or evacuated by means of a pump in vehicle seats known from prior art in order to change their shape and hence vary the contour of the supporting surface, the aircushion in the vehicle seat according to the invention is compressed from outside to bring about the desired change in shape, and hence the variation in contour of the supporting surface. This essentially eliminates the need for a pneumatic system with corresponding pump and corresponding feed lines to the aircushion. In this way, the vehicle seat according to an embodiment of the invention can have a particularly simple and therefore cost-effective structural design, wherein the outlay to avoid tightness problems is additionally especially low.

In a preferred embodiment of the vehicle seat according to the invention, the aircushion incorporates a constant volume of air. As a consequence, no pump is required for inflation or evacuation, thereby simplifying the structural design of the vehicle seat. No connecting lines need to be integrated between a pump and the aircushion in the vehicle seat. Finally, the aircushion only has to be designed in such a way that no air can be removed from the aircushion, and no additional air can get into the aircushion.

In order to achieve the aforementioned effect, the aircushion has an airtight, sealed sheath for accommodating the constant air volume in another preferred embodiment of the vehicle seat according to the invention. For example, the sheath can take the form of a balloon, without providing an opening for evacuating or inflating the aircushion in the sheath.

In order to be able to vary the shape of the aircushion despite the constant air volume inside the aircushion, the aircushion and/or the sheath of the latter is elastically malleable and/or compressible in another preferred embodiment of the vehicle seat according to the invention.

In an advantageous embodiment of the vehicle seat according to the invention, the aircushion is integrated into a seat portion and/or a backrest portion of the vehicle seat. As a result, the aircushion is protected against damage in an especially reliable manner, which is advantageous especially when the aircushion is to incorporate a constant air volume. In this embodiment, it is further preferred that the aircushion be imbedded into a corresponding padding, for example a foamed padding, of the seat portion and/or the backrest portion. The aircushion can here be partially or entirely imbedded in the corresponding padding. As an alternative, the aircushion can also be located on the outside of the seat portion and/or backrest portion to achieve better accessibility, thereby simplifying the attachment of the device for compressing the aircushion. In both instances, the aircushion can be adhesively bonded with the seat portion and/or backrest portion, for example.

In order to ensure a reliable lateral support for the vehicle passenger on the vehicle seat, the aircushion is integrated into a sidewall of the vehicle seat in another advantageous embodiment of the vehicle seat according to the invention, preferably in the padding of the sidewall, or outside on the sidewall. In the latter case, the aircushion can be arranged below on the sidewall, for example, so that it can be height-adjusted by compressing the aircushion. The sidewall of the vehicle seat can again be the sidewall of the seat portion and/or the backrest portion.

In a particularly preferred embodiment of the vehicle seat according to the invention, changing the shape of the aircushion makes it possible to vary the contour of the supporting surface in such a way that the height of the sidewall can be varied. The height of the sidewall refers in particular to its height relative to the seat surface of the seat portion or the backrest surface of the backrest portion.

In another advantageous embodiment of the vehicle seat according to the invention, the device for compressing the aircushion can be operated manually, electrically or pneumatically. Given a manual operation of the device, a hand-actuated unit such as a setting hand wheel or the like can be provided. Correspondingly, an electric motor or the like can be provided for an electrically operated device. The two initially mentioned embodiments are to be preferred to a pneumatically operated device, especially since a pneumatically operated device always requires a higher outlay in terms of system tightness. However, since the aircushion does not have to be inflated or evacuated, there is no need for corresponding feed lines from a pump to the aircushion, thereby reducing the structural design of the vehicle seat even when using a pneumatically operated device.

In another advantageous embodiment of the vehicle seat according to the invention, the device for compressing the aircushion can be moved from a first position into a second position, wherein the aircushion is more compressed in the second position of the device than in the first position of the device. For example, the aircushion cannot even be compressed in the first position of the device, so that it assumes its original shape.

In another advantageous embodiment of the vehicle seat according to the invention, the device for compressing the aircushion exhibits a first pressure portion and a second pressure portion for compressing the aircushion. The aircushion is arranged between the first and second pressure portion, wherein the two pressure portions can be moved relative to each other to compress the aircushion in the desired manner.

In another preferred embodiment of the vehicle seat according the invention, the pressure portions of the device for compressing the aircushion can be pivoted like tongs relative to each other. It is here advantageous if the swiveling axis of the pressure portions that can pivot like tongs relative to each other extend in the longitudinal direction of the seat portion or backrest portion, especially since the contour of the supporting surface can as a result only be varied by a device of the mentioned kind over the entire length of the seat portion or backrest portion.

In another particularly preferred embodiment of the vehicle seat according to the invention, one of the pressure portions of the device for compressing the aircushion is designed as a fixed pressure portion. As a result, the device can have an especially simple design, especially since only one of the two pressure portions has to be moved or pivoted like tongs relative to each other.

In another advantageous embodiment of the vehicle seat according to the invention, at least two aircushions are each provided with a device for compressing the respective aircushion, wherein the devices are coupled or can be coupled with each other in such a way as to allow them to be simultaneously moved into the first or second position. In this way, the vehicle passenger need only manually, electrically or pneumatically operate one of the two devices to also move the other device into one of the mentioned positions. This significantly simplifies the operation of the vehicle seat, wherein these advantages come to bear in particular when the one aircushion or one device interacts with the one sidewall and the other aircushion or other device interacts with the opposing sidewall, especially since the vehicle passenger generally wants a symmetrical modification of the sidewalls of the vehicle seat opposing each other in the transverse direction.

In another advantageous embodiment of the vehicle seat according to an embodiment of the invention, the two devices are coupled by a shared spindle drive, a shared rod assembly or shared sheathed cable system to actuate the device. For example, the spindle of the shared spindle drive can in this way be driven manually via a setting wheel or electrically via an electric motor. Regardless of whether a spindle drive, rod assembly or sheathed cable system is used, an especially compact and space-economizing configuration of the vehicle seat is possible.

The motor vehicle according to an embodiment of the invention exhibits a vehicle seat of the kind described.

In order to automatically adjust the contour of the supporting surface of the vehicle seat in such a way that the latter do not impede the vehicle passengers while entering or exiting, the motor vehicle in another preferred embodiment of the invention further exhibits a vehicle door allocated to the vehicle seat, which can be moved from an open position where the vehicle passenger can enter or exit to a closed position, wherein the vehicle door interacts with the device in such a way that the device can be moved into the first position by moving the vehicle door into the open position, and into the second position by moving the vehicle door into the closed position. This is advantageous in particular when the device or accompanying aircushion interacts with the sidewalls of the vehicle seat. As a result, the height of the sidewall of the vehicle seat can be reduced in the open position of the vehicle door, and elevated in the closed position of the vehicle door to achieve the advantages mentioned at the outset. For example, the vehicle seat can involve the driver's seat, while the vehicle door is comprised of the driver's door.

In order to achieve an especially simple coupling between the position of the vehicle door and the position of the device, the vehicle door in another preferred embodiment of the motor vehicle according to the invention is actively connected with the device by way of a rod assembly or sheathed cable.

BRIEF DESCRIPTION OF THE DRAWINGS

The present invention will hereinafter be described in conjunction with the following drawing figures, wherein like numerals denote like elements, and:

FIG. 1 is a cross sectional view of the seat portion of an embodiment of the vehicle seat according to the invention with the devices for compressing the aircushion in a first position; and FIG. 2 is the vehicle seat of FIG. 1 with the devices for compressing the aircushion into a second position.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

In the following, reference will be made to FIG. 1 and FIG. 2 in describing an embodiment of the vehicle seat 2 according to the invention based on the seat portion 4 of the vehicle seat 2, wherein the embodiments can analogously also apply with respect to the backrest portion of the vehicle seat 2, which is not depicted. In the figures, the seat direction 6 is denoted by a corresponding arrow, while the direction 8 opposite the seat direction 6 is also denoted by a corresponding arrow. In addition, the two mutually opposing height directions 10, 12 and the two mutually opposing transverse directions 14, 16 of the vehicle seat 2 are denoted by corresponding arrows.

The seat portion 4 of the vehicle seat 2 encompasses a central section 18 and two sidewalls 20 and 22 arranged in the transverse direction 14 and 16 on the central section 18. The two sidewalls 20, 22 in conjunction with the central section 18 form a supporting surface 24 to support the vehicle passengers, which is denoted by a dashed line in the figures.

Further provided are two variable-shape aircushions 26, 28 on the sides of the seat portion 4 facing the transverse directions 14 and 16, wherein changing the shape of the aircushion 26, 28 can vary the contour of the supporting surface 24, as will be explained later in greater detail. The two aircushions 26, 28 are arranged outside on the seat portion 4 or outside on the accompanying sidewall 20 and 22 of the seat portion 4. However, as an alternative, the aircushions 26, 28 could also be integrated into the seat portion 4 or into its sidewalls 20 and 22, preferably in the respective padding. In the present example, the aircushions 26, 28 are adhesively bonded from below with the sidewalls 20, 22. The aircushion 26, 28 exhibits an airtight, sealed sheath 30, 32, wherein a constant air volume 34, 36 is enveloped within the sheath 30, 32. As evident from the above, the sheath 30, 32 of the aircushion 26, 28 cannot be inflated or evacuated in the present embodiment. In order to still be able to change the shape of the aircushion 26, 28, the sheath 30, 32 is elastically deformable and/or compressible.

In order to make it possible to change the shape of aircushions 26, 28, a device 38, 40 is allocated to each of the aircushions 26, 28 to compress the respective aircushion 26, 28. The devices 38, 40 each consist of a first pressure portion 42 and a second pressure portion 44, which can be moved relative to each other. The two pressure portions 42, 44 can in this way be swiveled relative to each other like tongs around a pivoting axis 46, which extends in the seat direction 6, meaning in the longitudinal direction of the seat portion 4. The second pressure portion 44 arranged on the central section 18 of the seat portion 4 is here designed as a fixed pressure portion 44, so that only the first pressure portion 42 can be actively swiveled relative to the second pressure portion 44 around the pivoting axis 46.

The aircushion 26, 28 is arranged between the pressure portions 42, 44 arranged like tongs relative to each other, so that the aircushion 26, 28 can be at least partially compressed from outside by swiveling the first pressure portion 42. The aircushion 26, 28 faces a tong opening 48 of the tong-like device 38, 40, so as to be connected with the sidewall 20, 22 via the tong opening 48.

The two devices 38, 40 can be actuated or operated via a shared spindle drive 50. The devices 38, 40 can here be operated manually, electrically or pneumatically, wherein FIG. 1 denotes an actuating unit 52 for operating the spindle drive 50, which can involve a manually activatable setting wheel or an electric motor, for example.

The mode of operation of the vehicle seat 2 according to an embodiment of the invention will be described in greater detail below with reference to FIG. 1 and FIG. 2.

On FIG. 1, the devices 38, 40 have been moved to a first position, in which the sidewalls 20, 22 are arranged at a height h1 relative to the seat surface 54 of the central section 18 in the height direction 10, 12. In order to adjust the contour of the supporting surface 24 to the respective vehicle passenger, the spindle drive 50 is rotated with the help of the actuating unit 52, wherein the spindle drive 50 interacts with the first pressure portions 42 in such a way that the latter are swiveled around the pivoting axis 46 toward the second pressure portion 44. This brings the devices 38, 40 into the second position depicted on FIG. 2, in which the aircushion 26, 28 is compressed from outside to a greater extent than in the first position, thereby changing the shape of the aircushion 26, 28. The two devices 38, 40 are coupled or can be coupled together via the shared spindle drive 50, so that the latter are simultaneously moved into the second position depicted on FIG. 2.

Due to the constant air volume inside the airtight sealed sheath 30, 32 of the aircushion 26, 28 and the pressure exerted by the devices 38, 40 on the aircushion 26, 28, the aircushion 26, 28 deforms in such a way as to be squeezed upwardly forward through the tong opening 48, so that the sidewalls 20, 22 are also shifted upwardly in the height direction 10 to a height h2 relative to the seat surface 54. This means that the height of the sidewall 20, 22 can be varied or adjusted by changing the shape of the aircushion 26, 28. In the present example, height h2>height h1. In conclusion, let it be mentioned that the two devices 38, 40 are also actuated and can be coupled via a shared rod assembly or a shared sheathed cable system.

The present embodiment does entirely without a pump and corresponding feed lines to inflate or evacuate the aircushions 26, 28, especially since the aircushions 26, 28 are intended to hold a constant air volume 34, 36 anyway. As a result, the structural design of the vehicle seat 2 is lastingly simplified, wherein in particular no outlay need be incurred to overcome whatever tightness problems may be encountered. The maintenance outlay is also clearly reduced by comparison to conventional vehicle seats with inflatable or evacuatable aircushions.

Also provided inside the motor vehicle (not shown) is a vehicle door (not shown) allocated to the vehicle seat 2 in a transverse direction 14 or 16. This vehicle door can be moved from an open position into a closed position. The vehicle door here works in conjunction with the actuating unit 52, spindle drive 50 and two devices 38, 40 via the operational connection 56 indicated only schematically on FIG. 1 and FIG. 2 in such a way that the devices 38, 40 are moved to the first position by moving the vehicle door to the open position (FIG. 1), and to the second position by moving the vehicle door into the closed position (FIG. 2). This automatically reduces the height of the sidewalls 20, 22 while opening the vehicle door, thereby making it easier for the vehicle passenger to get in and out. After entry or egress is complete and the vehicle door has been moved to the closed position, the sidewalls 20, 22 again return to their original height h2, in which the latter provide reliable support to the vehicle passenger in the transverse direction 14 or 16. Let it additionally be mentioned that the operational connection 56 between the vehicle door and the devices 38, 40 can also be realized by a rod assembly or sheathed cable.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A vehicle seat, comprising:
   a supporting surface;
   a variable-shape aircushion, wherein a contour of the supporting surface is adapted to vary by changing a shape of the variable-shape aircushion; and
   a drivable device with which the variable-shape aircushion is adapted to compress at least partially from an outside to produce the changing of the shape of the variable-shape aircushion, the drivable device comprising a first pressure portion and a second pressure portion, wherein the variable-shape air cushion is disposed between the first and second pressure portions, wherein the first and second pressure portions are adapted to be moved relative to each other to compress the variable-shape aircushion in a desired manner, and wherein the first pressure portion and the second pressure portion are disposed on opposing lateral sides of the vehicle seat.

2. The vehicle seat according to claim 1, wherein the variable-shape aircushion is adapted to incorporate a substantially constant air volume.

3. The vehicle seat according to claim 2, wherein the variable-shape aircushion comprises a substantially airtight and substantially sealed sheath adapted to hold the substantially constant air volume.

4. The vehicle seat according to claim 1, wherein the variable-shape aircushion is elastically deformable or compressible.

5. The vehicle seat according to claim 1, wherein the variable-shape aircushion is integrated in a portion of the vehicle seat.

6. The vehicle seat according to claim 1, wherein the variable-shape aircushion is integrated into a sidewall of the vehicle seat.

7. The vehicle seat according to claim 6, wherein changing the shape of the variable-shape aircushion varies a height of the sidewall.

8. The vehicle seat according to claim 1, wherein the drivable device is adapted for manual operation.

9. The vehicle seat according to claim 1, wherein the first pressure portion of the drivable device is configured to swivel to thereby compress the variable shape aircushion and vary a height of a sidewall of the vehicle seat.

10. The vehicle seat according to claim 1, wherein the first pressure portion and a second pressure portion are adapted to pivot like tongs relative to each other, and one of the first pressure portion or the second pressure portion is a fixed pressure portion.

11. The vehicle seat according to claim 9, further comprising a second variable-shape aircushion with a second drivable device adapted to compress the second variable-shape aircushion, wherein the drivable device and the second drivable device are coupled to provide a substantially simultaneous move into the first position or the second position.

12. The vehicle seat according to claim 11, wherein the drivable device and the second drivable device are coupled with a shared spindle drive to actuate the drivable device and the second drivable device.

13. A motor vehicle, comprising: drivable
   a vehicle seat, the vehicle seat comprising:
   a supporting surface;
   a variable-shape aircushion, wherein a contour of the supporting surface is adapted to vary by changing a shape of the variable-shape aircushion; and
   a drivable device with which the variable-shape aircushion is adapted to compress at least partially from an outside to produce the changing of the shape of the variable-shape aircushion, the drivable device comprising a first pressure portion and a second pressure portion, wherein the variable-shape air cushion is disposed between the first and second pressure portions, wherein the first and second pressure portions are adapted to be moved relative to each other to compress the variable-shape aircushion in a desired manner, and wherein the first pressure portion and the second pressure portion are disposed on opposing lateral sides of the vehicle seat.

14. The motor vehicle according to claim 13, further comprising a vehicle door allocated to the vehicle seat that is adapted to move from an open position into a closed position, wherein the vehicle door is adapted to interact with the drivable device such that the drivable device can be moved to a first position by moving the vehicle door to the open position, and to a second position by moving the vehicle door to the closed position, and wherein the vehicle door is operationally connected with the drivable device by a rod assembly or a sheathed cable.

15. The motor vehicle according to claim 13 wherein the first pressure portion of the drivable device is configured to swivel to thereby compress the variable shape aircushion and vary a height of a sidewall of the vehicle seat.

16. The vehicle seat according to claim 3, wherein the substantially sealed sheath is elastically deformable or compressible.

17. The vehicle seat according to claim 1, wherein the drivable device is adapted for electrical operation.

18. The vehicle seat according to claim 1, wherein the drivable device is adapted for pneumatic operation.

19. The vehicle seat according to claim 11, wherein the drivable device and the second drivable device are coupled with a shared sheathed cable system to actuate the drivable device and the second drivable device.

20. The vehicle seat according to claim 11, wherein the drivable device and the second drivable device are coupled with a shared rod assembly to actuate the drivable device and the second drivable device.

* * * * *